(12) United States Patent
Chevalier et al.

(10) Patent No.: US 10,157,229 B1
(45) Date of Patent: Dec. 18, 2018

(54) METHODS AND SYSTEMS FOR BUILDING A SEARCH SERVICE APPLICATION

(75) Inventors: Pierre-Yves Chevalier, Biviers (FR); Marc Brette, Domene (FR); Samir Batla, Rumford, RI (US); David Le Strat, Danville, CA (US)

(73) Assignee: Open Text Corporation, Waterloo (CA)

( * ) Notice: Subject to any disclaimer, the term of this patent is extended or adjusted under 35 U.S.C. 154(b) by 228 days.

(21) Appl. No.: 13/537,311

(22) Filed: Jun. 29, 2012

(51) Int. Cl.
*G06F 7/00* (2006.01)
*G06F 17/30* (2006.01)

(52) U.S. Cl.
CPC ............ *G06F 17/30864* (2013.01)

(58) Field of Classification Search
None
See application file for complete search history.

(56) References Cited

U.S. PATENT DOCUMENTS

| | | | |
|---|---|---|---|
| 7,415,484 B1 | 8/2008 | Tulkoff et al. | |
| 7,509,332 B1 * | 3/2009 | Milby | G06F 17/30312 |
| 7,877,386 B2 * | 1/2011 | Shurtleff | 707/736 |
| 2001/0049679 A1 * | 12/2001 | Yonaitis | G06F 17/30587 |
| 2003/0083959 A1 | 5/2003 | Song et al. | |
| 2005/0198052 A1 * | 9/2005 | Steinmaier | G06F 17/30398 |
| 2005/0216304 A1 * | 9/2005 | Westphal | 705/1 |
| 2007/0185826 A1 * | 8/2007 | Brice | G06F 17/30306 |
| 2007/0250492 A1 * | 10/2007 | Angel | G06F 17/3097 |
| 2007/0266015 A1 | 11/2007 | Shakib et al. | |
| 2008/0097975 A1 * | 4/2008 | Guay et al. | 707/4 |
| 2008/0208808 A1 * | 8/2008 | Sue | G06F 17/30864 |
| 2009/0106191 A1 | 4/2009 | Gutlapalli et al. | |
| 2009/0106294 A1 * | 4/2009 | Gutlapalli | G06F 17/3056 |
| 2010/0057702 A1 * | 3/2010 | Ghosh | G06F 17/30539 707/E17.135 |
| 2012/0215766 A1 * | 8/2012 | Gorelik | G06F 17/30554 707/722 |
| 2012/0331118 A1 * | 12/2012 | Stein et al. | 709/223 |
| 2013/0166573 A1 * | 6/2013 | Vaitheeswaran et al. | 707/749 |

(Continued)

OTHER PUBLICATIONS

Office Action issued for U.S. Appl. No. 13/538,207, dated Nov. 27, 2013, 28 pages.

(Continued)

*Primary Examiner* — David T. Brooks
(74) *Attorney, Agent, or Firm* — Sprinkle IPLaw Group

(57) ABSTRACT

A system for providing a search service is disclosed and includes a processor-based search service application builder component that provides a search model representing a search service application for a first object of a plurality of objects. The search model is based at least on a user-defined end-user input field corresponding to a first attribute of a plurality of attributes associated with the first object and a user-defined search result output field corresponding to a second attribute of the plurality of attributes. The search model is also associated with a backend data store that supports a storage structure configured to store information relating to the first object. The system also includes a processor-based deployment engine that automatically configures a search engine system associated with the backend data store system to generate and/or update search index(es) based on at least one of the first attribute and the second attribute.

20 Claims, 9 Drawing Sheets

---

250

- 252: Providing a search model representing a search service application for a first object of a plurality of objects, where each object is associated with attributes, and where the search model is based at least on a user-defined end-user input field corresponding to a first attribute and a user-defined search result output field corresponding to a second attribute, and where the search model is associated with a backend data store that supports a storage structure configured to store information relating to the first object in a data record

- 254: Configuring a search engine system associated with the specified backend data storage system to at least one of generate and update at least one search index based on at least one of the first attribute and the second attribute

(56) References Cited

U.S. PATENT DOCUMENTS

2013/0290321 A1  10/2013  Shapira et al.
2018/0300345 A1  10/2018  Brette et al.

OTHER PUBLICATIONS

Office Action issued for U.S. Appl. No. 13/538,207, dated Mar. 24, 2014, 31 pages.
Office Action issued for U.S. Appl. No. 13/538,207, dated Feb. 10, 2015, 37 pages.
Office Action issued for U.S. Appl. No. 13/538,207, dated May 29, 2015, 39 pages.
Office Action issued for U.S. Appl. No. 13/538,207, dated Mar. 24, 2016, 44 pages.
Office Action issued for U.S. Appl. No. 13/538,207, dated Nov. 25, 2016, 50 pages.
Office Action issued for U.S. Appl. No. 13/538,207, dated Jul. 10, 2017, 62 pages.
Notice of Allowance for U.S. Appl. No. 13/538,207, dated Dec. 13, 2017, 8 pgs.
Notice of Allowance for U.S. Appl. No. 13/538,207, dated Mar. 22, 2018, 2 pgs.

\* cited by examiner

| Query End-User Inputs | | | Customer | |
|---|---|---|---|---|
| | | | Search | |
| Input label: First Name | | ─705 | ☐ Birthdate | |
| | End-User Input Field | Operator | ☐ Changed By | |
| 704 | Customer.First.Name | = | ☐ Created By | |
| | | | ☐ Created on | 515b |
| Input label: Last Name | | | ☑ First Name | |
| | End-User Input Field | Operator | ☑ Last Name | |
| 704a | Customer.Last.Name | = | ☐ City | 515c |
| | | | ☐ Occupation | |
| | | (703) | 515 (702) | |

| Properties | | | | |
|---|---|---|---|---|
| Input Label | | | | |
| Input label: | Last Name | | | ─706 |
| System name: | Last_name | | (Input_last_name) | Submit |

| Query Search Result outputs | | | Customer | |
|---|---|---|---|---|
| | | | Search | |
| | Search Result Output Field | | ☐ Birthdate | |
| 710 | First Name | ☐ Enable sorting | ☐ Changed By | |
| | Last Name | ☒ Enable sorting | ☐ Created By | |
| | Occupation | ☐ Enable sorting | ☐ Created on | 515b |
| | | 711─ Add | ☑ First Name | |
| | | | ☑ Last Name | |
| Query Search Result Filters | 714 | 716 | ☐ City | 515c |
| | Search Result Filtering Field | Operator | Value | ☑ Occupation |
| 712 | Last Name | = | Smith | 515d |
| | City | = | Smallville | |
| | Birthdate | after | 01/01/2000 | 515 |
| | | 706 | Add | |
| (703) | | Submit | | (702) |

Search Customer

Full-Text: [_____] —803  802
First Name: [_____]
Last Name: [_____]

( Search )
806

| | First Name | Last Name | Occupation | 804 |
|---|---|---|---|---|
| [-] Last Name | | | | |
| John (1) | Emily | Lee | Programmer | |
| Smith (2) | | | | |
| Lee (2) | Roger | Smith | Administrator | |
| [-] City | | | | |
| Las Vegas (1) | Timothy | Lee | Programmer | |
| Phoenix (1) | | | | |
| Los Angeles (3) | Clare | Smith | Programmer | |
| [-] Occupation | | | | |
| Programmer (3) | Daniel | John | Trainer | |
| Administrator (1) | | | | |
| Trainer (1) | | | | |

METHODS AND SYSTEMS FOR BUILDING A SEARCH SERVICE APPLICATION

BACKGROUND

A case management application helps an enterprise to manage its business processes by providing a computer-based framework for collecting, tracking and storing business process information. For example, a case management application can assist the enterprise to collect and store case management data associated with a loan application process, an insurance claim process, and the like. In some cases, the case management application can also support data searching services that allow an end-user to search for and to retrieve case management data and/or non-enterprise related information relevant to performing a process task. In these cases, the application can be referred to as a search-based case management application.

Typically, the search-based case management application is customized to the enterprise's business process. Building such an application is complex and typically requires skilled programmers to write customized code to handle various phases of the enterprise's business process. Enabling search capabilities is particularly difficult because the programmers must build search queries for a variety of backend storage structures, must configure search indexing engines to build indexes based on the enterprise's specifications, and must configure document analyzers to annotate documents in the repository in order to make them searchable. Accordingly, the application building process for a search-based case management application is expensive and time-consuming.

To address some aspects of this issue, computer-based solutions are available that allow the enterprise's business expert to design and configure a case management application for a business process without requiring programmers to write custom code. In essence, the solution supports automated code generation based on configuration information provided by the business expert. For example, Documentum xCP Designer by EMC Corporation of Hopkinton, Mass. is a configuration-based solution that provides graphical composition tools for the business expert to design case management applications. Using a drag-and-drop graphical toolset, the business expert can model business processes, design electronic forms, and design user interfaces, from which the system can build the application.

While computer-based application building solutions can significantly reduce or eliminate the need for custom coding to build a case management application, enabling a search service within the case management application is not supported and therefore, remains a manual process requiring a skilled programmer to write custom coding. Accordingly, building a search-based case management application continues to be an expensive and time-consuming process.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIGS. 7A-7D illustrate exemplary user interfaces for building a search service application according to an exemplary embodiment; and FIG. 8 illustrates an exemplary user interface for receiving query inputs and for providing search results according to an exemplary embodiment.

DETAILED DESCRIPTION

The subject matter presented herein provides a computer-based system for designing, building, and deploying a search service application. According to an embodiment, an application design system includes a search service application builder component that provides a model configured to guide a business expert through a series of steps to design a custom search service application. In an embodiment, the model allows the business expert to select which attributes of an object can be searched and what information will be returned in a search result. The model can also enable the business expert to specify other search features, such as filters, facets, sorts and the like. When the business expert is done designing the search service application, the search service application builder component automatically provides computer code for the custom search service application based on the business expert's selections. The resulting custom search service application can then be a standalone component and/or integrated with a case management application.

In an embodiment, when the search service application is built, the application building component can also automatically deploy the search service application. For example, a deployment engine provided by the application building component can automatically configure a search engine associated with a data store that stores the information relating to the object. In an embodiment, the search engine can be configured to create and/or update one or more search indexes based on the selected searchable attributes of the object and based on the information that will be returned in the search result. The search engine can also be configured to expose the other search features specified by the business expert, such as attributes associated with filters, and facets, and stored attributes.

Figure 1:
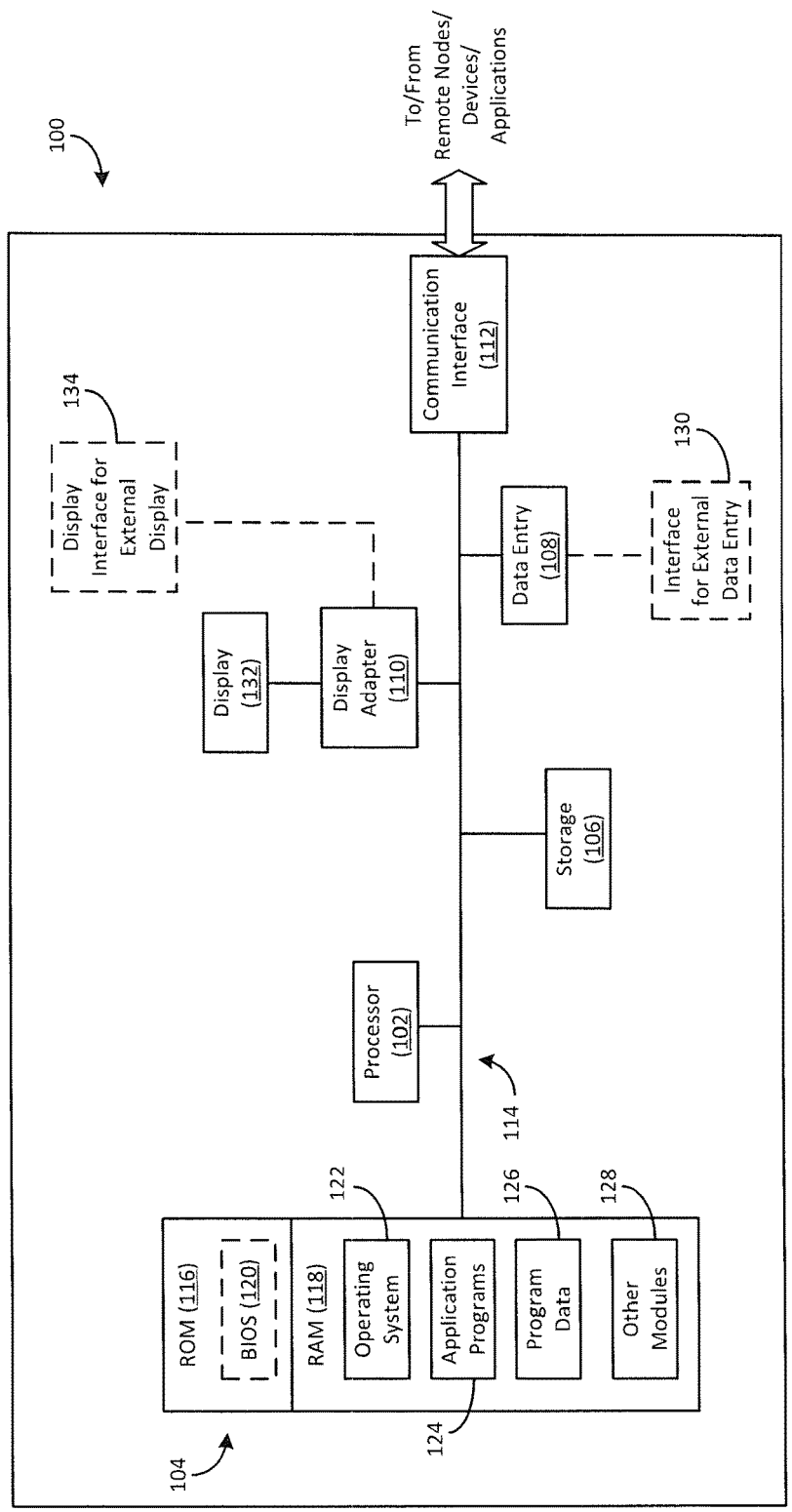
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Search Service Application Building

Figure 2A:
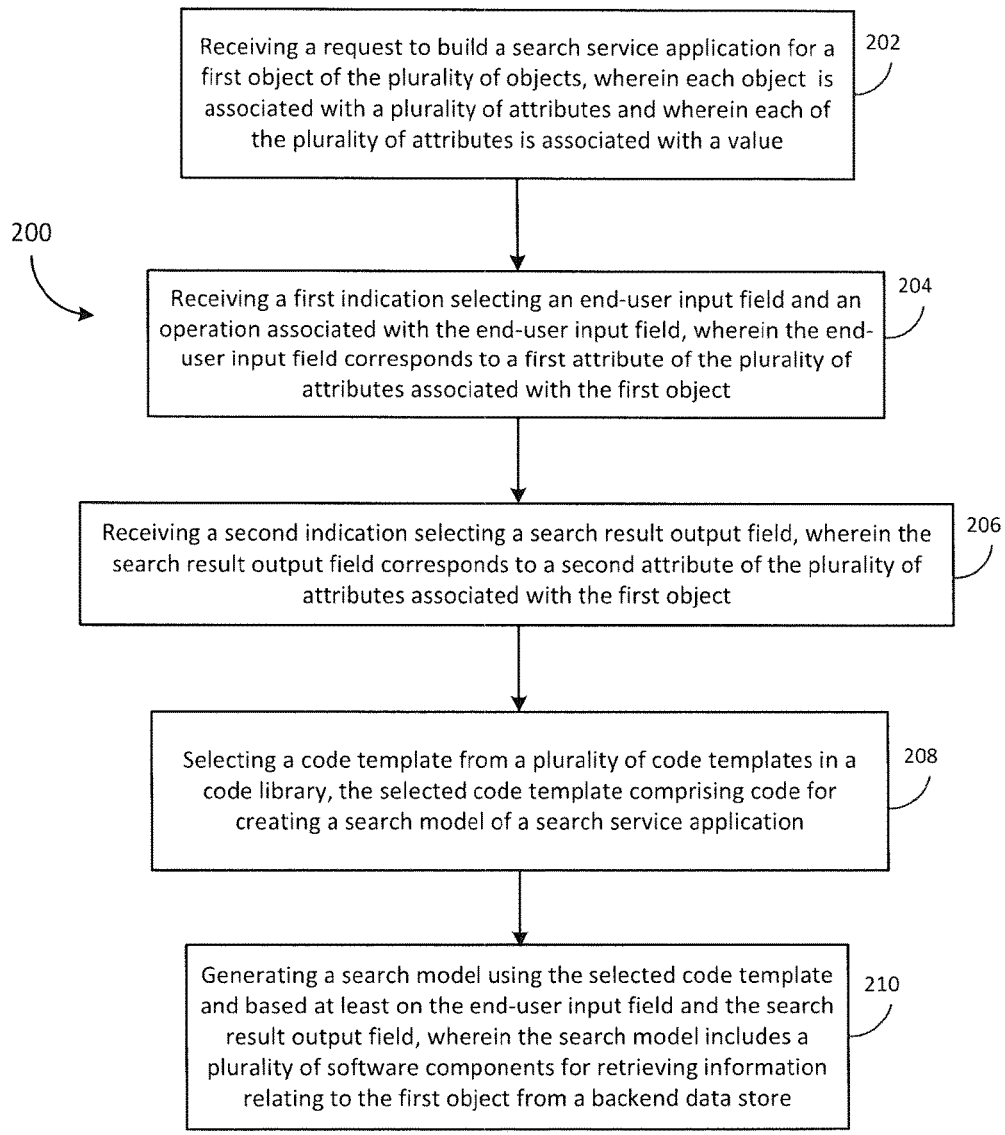
FIG. 2A is a flow diagram illustrating an exemplary method for building a search service application according to an exemplary embodiment.
Figure 3:
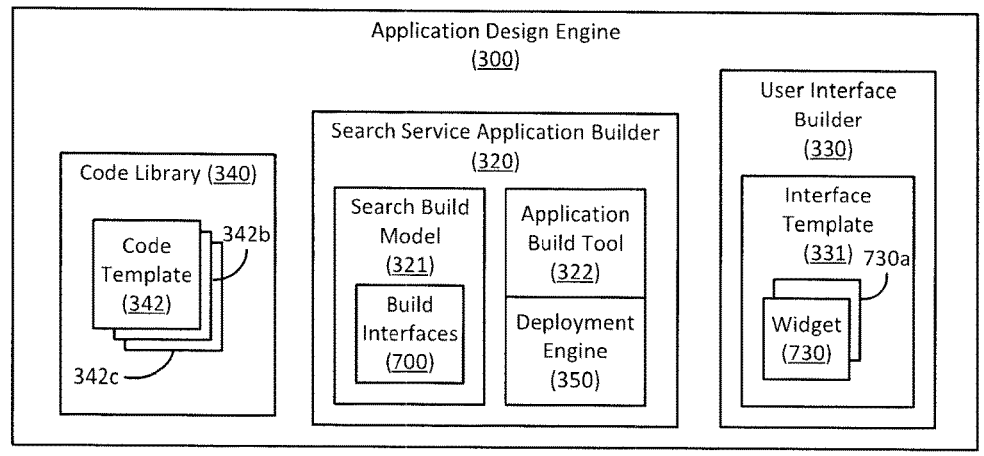
FIG. 3 is a block diagram illustrating an exemplary system for building a search service application according to an exemplary embodiment.

Referring now to FIG. 2A, a flow diagram is presented illustrating a method 200 for building a search service application according to an exemplary embodiment. FIG. 3 is a block diagram illustrating an exemplary system for building a search service application according to embodiments of the subject matter described herein. The method 200 illustrated in FIG. 2A can be carried out by, for example, at least some of the components in the exemplary arrangement of components illustrated in FIG. 3. The arrangement of components in FIG. 3 may be implemented by some or all of the components of the hardware device 100 of FIG. 1.

Figure 4:
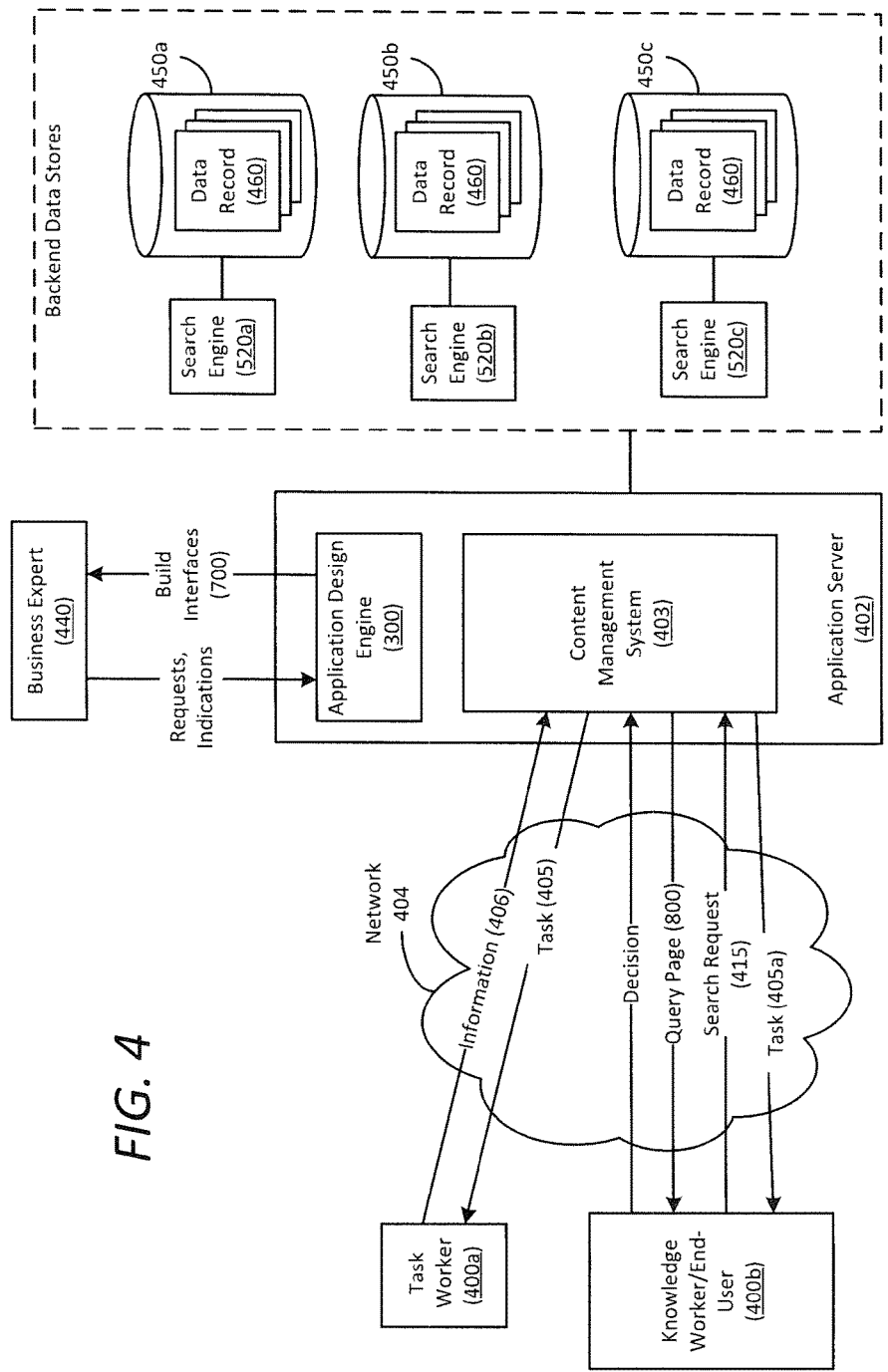
FIG. 4 is a block diagram illustrating a network in which a system for building a search service application can be implemented

FIG. 3 illustrates components that are configured to operate within an execution environment hosted by a computer device and/or multiple computer devices, as in a distributed execution environment. For example, FIG. 4 illustrates a plurality of computer devices 400a, 400b, 402 communicatively coupled to one another via a network 404, such as the Internet, where an application server 402 can be configured to provide an execution environment configured to support the operation of the components illustrated in FIG. 3 and/or their analogs. Exemplary computer devices can include physical or virtual desktop computers, servers, networking devices, notebook computers, PDAs, mobile phones, digital image capture devices, and the like.

Figure 5:
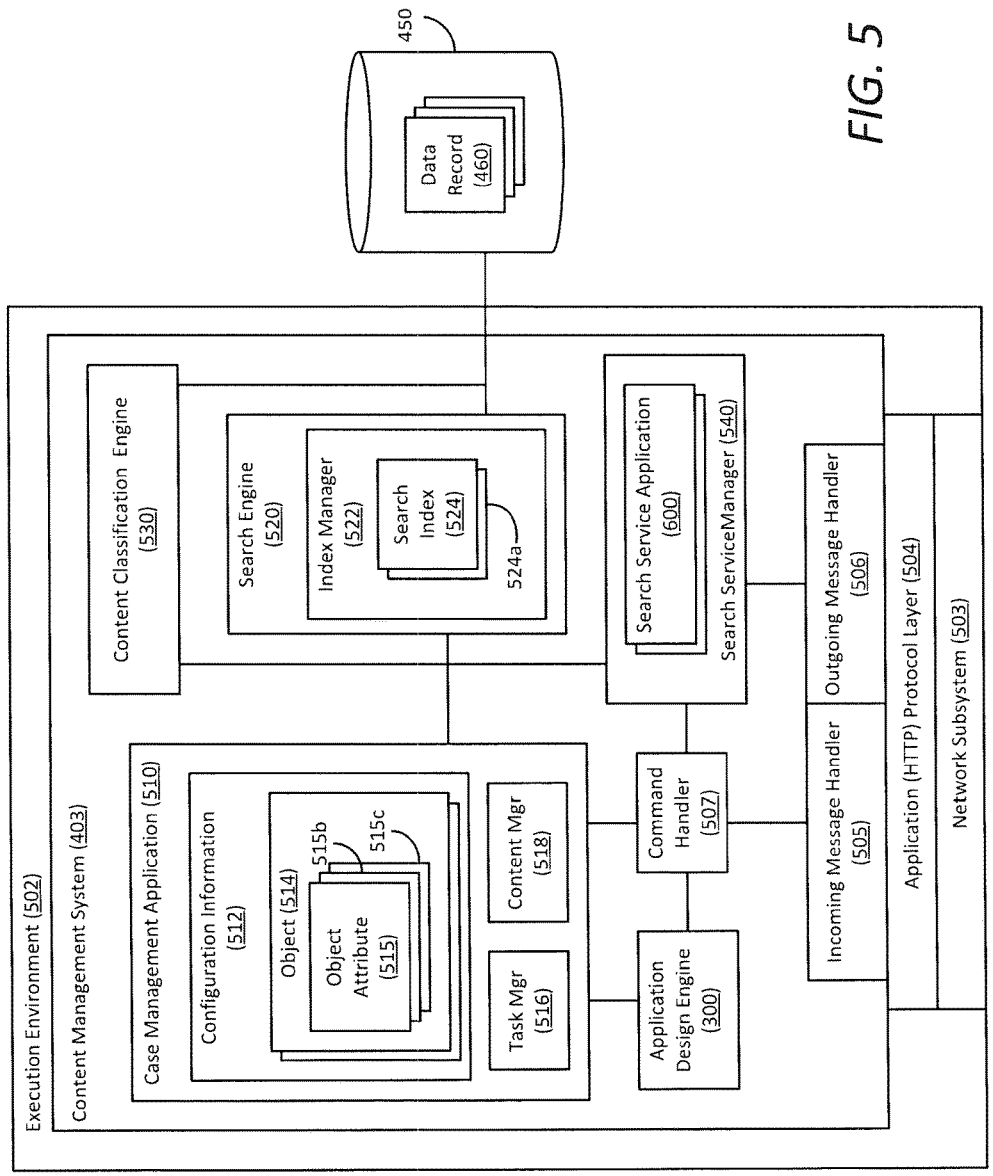
FIG. 5 is a block diagram illustrating another exemplary system for building a search service application according to an exemplary embodiment.

According to an embodiment, the application server 402 can also be configured to host a content management system 403. FIG. 5 is a block diagram illustrating an exemplary content management system 403 according to an embodiment. In an embodiment, the content management system 403 can include one or more case management applications 510, a search engine 520, and a content classification engine 530. In an embodiment, the search engine 520 and/or the content classification engine 530 can be independent components that are external to the case management system 403 and/or can be hosted by separate computer devices communicatively coupled to the application server 402.

The case management application 510 can be configured to collect and manage information relating to a business process, such as, for example, a loan application process, an insurance claim process, and the like. The case management application 510, in an embodiment, can include configuration information 512 that defines tasks and objects 514 associated with the business process. Each object 514 can be associated with a plurality of attributes 515. For example, for an insurance claim process, an object 514 can represent a customer and its attributes 515 can include the customer's first name and the customer's last name. Other objects 514 can represent documents, files, folders, and the like.

During runtime, a task manager component 516 in the case management application 510 can manage the business process by distributing tasks 405, 405a to task workers 400a and knowledge workers 400b. When a task, e.g., 405, is directed to collecting information, e.g., documents or forms, the task worker 400a can perform the task and transmit the information 406 back to the case management application 510. A content manager component 518 in the case management application 510 can be configured to receive the information 406 and to store it in a backend data store 450, which can be configured to support a storage structure for managing and storing the information 406. Exemplary storage structures include a file storage system, a relational database, a native XML database, and the like. In an embodiment, more than one backend data store 450a-450c can be provided to support more than one storage structure. In each data store 450a-450c, the information 406 can be stored as a data record 460 in the corresponding storage structures.

In addition, in an embodiment, the content manager 518 can transmit the collected information 406 to the search engine 520 and/or to the content classification engine 530 for processing. According to an embodiment, each backend data store 450 can be associated with a search engine 520 configured to process search requests for information stored in the associated data store 450. Thus, as shown in FIG. 4, a first search engine 520a can be configured to process search requests for information in a first backend data store 450a that supports a relational database, while a second search engine 520b can be configured to process search requests for a second backend data store 450b that supports a file storage system, and a third search engine 520c can be configured to process search requests for a third backend data store 450c that supports a native XML database.

In an embodiment, each the search engine 520 can include an index manager 522 that manages, e.g., creates and updates, a plurality of search indexes 524 pertaining to a plurality of data records 460 stored in the associated data store 450. In an embodiment, the data records 460 include information relating to the objects 514 associated with the business process. When new or updated information 406 is received, the index manager 522 can update the appropriate search indexes 524. In addition or alternatively, when needed, the content classification engine 530 can be configured to semantically analyze the content of the information 406 in order to classify and categorize the information. The content classification engine 530 can be configured, in an embodiment, to create content metadata, which can then be used by the search engine 520 to update and/or create search indexes 524.

With reference to FIG. 2, in block 202, a request to build a search service application for a first object of a plurality of objects is received, where each object is associated with a plurality of attributes and where each of the plurality of attributes is associated with a value. According to an embodiment, FIG. 3 illustrates a search service application builder component 320 in an application design engine 300 that is configured to receive a request to build a search service application for a first object of a plurality of objects. FIG. 5 illustrates that the application design engine 300 can be integrated within the content management system 403 which includes components adapted for operating in an execution environment 502. The execution environment 502, or an analog, can be provided by a computer device such as the application server 402. Alternatively, the application design engine 300 can operate separately from the case management system 403, as shown in FIG. 4, or in another computer device communicatively coupled to the content management system 403.

According to an embodiment, an enterprise's business expert 440 and/or case management administrator can be responsible for configuring a case management application 510. For example, the business expert 440 can define the objects 514, e.g., business objects, content objects, task objects, and the like, and object attributes 515 associated with the objects 514. In addition, the business expert 440 can be responsible for building applications, such as search service applications 600, that are used by the case management application 510. According to an embodiment, the business expert 440 can submit the request to build a search service application 600 directly to the search service application builder component 320. Alternatively, the request can be submitted to the case management application 510, which can be configured to route the request to the search service application builder component 320 in the application design engine 300. In an embodiment, the request received by the search service application builder component 320 can include information identifying the first object 514.

The case management application 510 can be configured to receive the request to build the search service application via a network subsystem 503 and an application protocol layer, or other higher protocol layer, as illustrated by an exemplary HTTP protocol layer 504, among many possible standard and proprietary protocol layers. These higher protocol layers can encode, package, and/or reformat data for sending and receiving messages over a network layer, such as Internet Protocol (IP), and/or a transport layer, such as Transmission Control Protocol (TCP) and/or User Datagram Protocol (UDP). A command handler component 507 in the case management system 403 can be configured to receive the request via an incoming message handler 505 and to route the request to the case management application 510 or to the application design engine 300.

In an embodiment, when the search service application builder component 320 in the application design engine 300 receives the request to build the search service application from the business expert 440, it can be configured to invoke a search build model 321 that allows the business expert 440 to configure the search service application 600 through a series of build interfaces 700. For example, the business expert 440 can specify a query type for the first object 514 via a build interface 700 that presents a plurality of query types associated with a plurality of storage structures. Exemplary query types include full-text queries, real-time queries, historical queries, and task-list queries; and as stated above, exemplary storage structures include a relational database, a native XML database, a file storage system, and a real-time data store. Other query types and other storage structures exist and are not limited to those types listed above. In an embodiment, the search service application builder component 320 can be configured to receive an indication specifying the query type via the build interface 700.

Referring again to FIG. 2A in block 204, a first indication selecting an end-user input field and an operator associated with the end-user input field is received. According to an embodiment, the end-user input field corresponds to a first attribute of the plurality of attributes associated with the first object. The search build model 321 in the search service application builder component 320 that can be configured, in an embodiment, to receive a first indication selecting an end-user input field and an operator.

In addition to specifying a query type, the business expert 440 can also determine which query inputs the search service application 600 will accept from an end-user. FIG. 7A illustrates an exemplary build interface 700*a* that can be presented to the business expert 440 for selecting the end-user input field and its associated operator. As mentioned above, the request includes information identifying the first object 514 for which the search service application 600 is built. For example, in FIG. 7A, the first object 514 is "customer." In an embodiment, the search build model 321 can be configured to retrieve the attributes 515 associated the first object, and to present them in an attribute window 702. From here, the business expert 440 can select which attribute(s) 515 of the customer object 514 will be a query input(s) that forms a search criterion/criteria. In FIG. 7A, the business expert 440 can select an attribute 515 by "checking" a checkbox associated with an attribute 515. In other embodiments, the business expert 440 can "drag and drop" the attribute 515 from the attribute window 702 into a workspace window 703.

In FIG. 7A, the business expert 440 has selected an attribute 515*b*, "First Name," as an end-user input field 704, and another attribute 515*c*, "Last Name," as another end-user input field 704*a*. In addition, the business expert 440 can select an operator 705, e.g., equal (=), greater than (>), before date, etc., associated with the selected end-user input field 704, 704*a*, which can depend on the data type of the attribute 515. In an embodiment, when the business expert 440 finishes selecting the end-user input field(s) 704, 704*a* and the operator(s) 705, she can submit the first indication by selecting a submit button 706.

Referring again to FIG. 2A in block 206, a second indication selecting a search result output field is received. According to an embodiment, the search result output field corresponds to a second attribute of the plurality of attributes associated with the first object. In an embodiment, the search build model 321 in the search service application builder component 320 can be configured to receive the second indication selecting a search result output field.

According to an embodiment, the search build model 321 can allow the business expert 440 to determine what information the search service application 600 will return to the end-user as a search result. FIG. 7B illustrates an exemplary build interface 700b that can be presented to the business expert 440 for selecting query search result outputs. In an embodiment, the object attributes 515 associated with the first object 514 are presented in the attribute window 702. From here, the business expert 440 can select which attribute(s) 515 of the customer object 514 will be provided as a search result output(s). In FIG. 7B, the business expert 440 has selected the first attribute 515b, First Name, as a search result output field 710, another attribute 515c, Last Name, as another search result output field 710, and yet another attribute 515d, "Occupation," as another search result output field 710. Thus, in this example, the search result will include a customer's first name, last name and occupation.

In an embodiment, the search result can be sorted based on any of the search result output fields 710. For example, during the search service application building process, the business expert 440 can enable sorting by selecting a box 711 associated with the search result output field 710. In FIG. 7B, the business expert 440 has enabled sorting by the customer's last name only. In an embodiment, when the business expert 440 finishes selecting the search result output field(s) 710, she can submit the second indication by selecting a submit button 706.

In addition to selecting output fields 710, the search build model 321 can also allow the business expert 440 to select search result filtering fields to filter the search result in another embodiment. For example, in FIG. 7B, the business expert 440 can drag and drop the Last Name attribute 515b from the attribute window 702 into the search result filtering field 712, select an "equal" operator 714, and provide a value 716 for the Last Name attribute 515b, e.g., Smith, to filter any search result where the customer's last name is Smith. In an embodiment, when the business expert 440 finishes selecting the search result filtering field(s) 712, operator(s) 714, and value(s) 716 of the search result filtering field(s) 712, she can submit these selections in a third indication to the search service application builder component 320 by selecting the submit button 706.

Figure 7C:
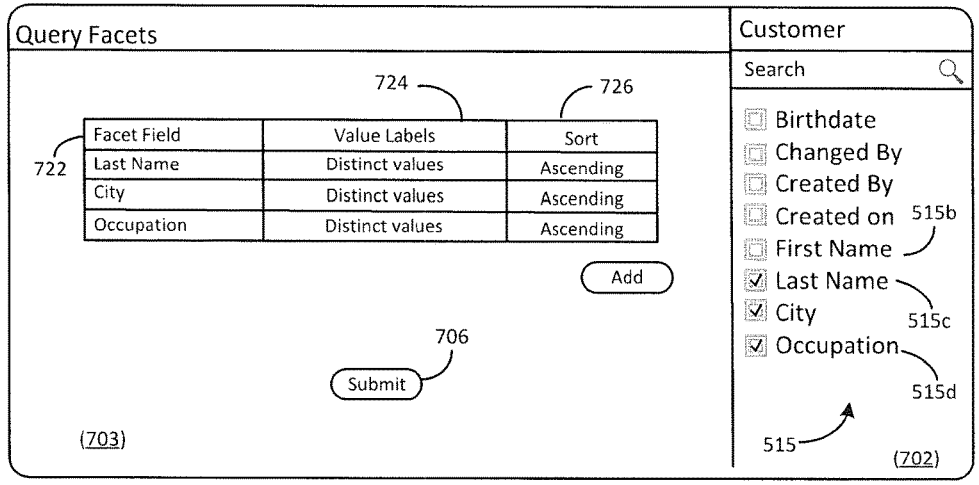

In another embodiment, the search build model 321 can also allow the business expert 440 to select a facets field corresponding to an attribute 515 associated with the object 514 in order to group the search results by the attribute 515 corresponding to the facets field. FIG. 7C illustrates an exemplary build interface 700c that can be presented to the business expert 440 for selecting facets according to an embodiment. As is shown, the business expert 440 can drag and drop the Last Name attribute 515b from the attribute window 702 into the facets field 722, can select a value label 724, and optionally can indicate how to sort the information 726 so that the search results can be grouped by the customer's last name. The business expert 440 can submit the facets field selection(s) in an indication to the search service application builder component 320 by selecting the submit button 706.

According to an exemplary embodiment, in addition to determining end-user inputs and configuring the result set, the business expert 440 can design a user interface for the end-user, e.g., a knowledge worker 400b. In an embodiment, the application design engine 300 can include a user interface builder component 330 that is configured to receive a request from the business expert 440 to design an end-user interface template 331 for the search service application for the first object 514. In response to receiving the request, the user interface builder component 330 can present a build interface 700 that allows the business expert 440 to design the end-user interface template 331.

Figure 7D:
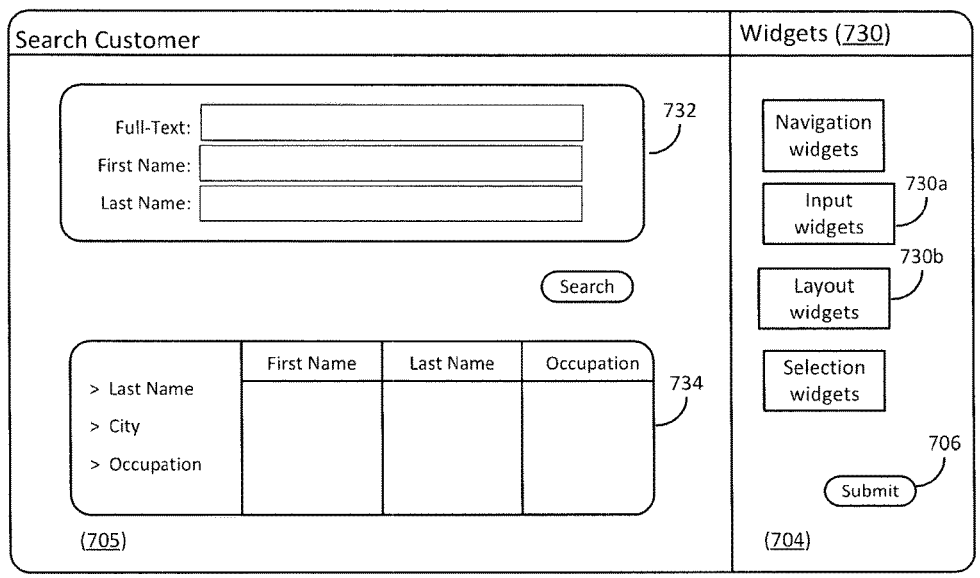

FIG. 7D illustrates an exemplary build interface 700d that can be presented to the business expert 440 for this purpose. In an embodiment, the build interface 700d can include a plurality of widgets 730 from which the business expert 440 can select. For example, the widgets 730 can include navigation widgets (e.g., a content tree, a navigation menu), input widgets 730a (e.g., checkbox, text input), layout widgets 730b (e.g., column box, content area), and selection widgets (e.g., drop-down list), to name a few. According to an embodiment, the business expert 440 can select a first widget 730a associated with the end-user input field(s) 704 and a second widget 730b associated with the search result output field(s) 710. The first and second widgets 730a, 730b define how the end-user input 704 and search result output 710 fields, respectively, will be presented to the end-user 500b.

In an embodiment, the business expert 440 can select the first 730a and second 730b widgets from a widget window 704 and drop it into a preview window 705 to design the end-user interface template 331. In FIG. 7D, the end-user input fields 704, 704a selected in FIG. 7A are associated with text input box (input) widgets 730a in an end-user input section 732, and also because the query type is a full-text query, a text input box widget 730a is provided. In a search result section 734, the search result output fields 710 selected in FIG. 7B are associated with a column box (layout) widget 730b, and the fields 710 are arranged as columns. In addition, the facets fields 722 selected in FIG. 7C are associated with expandable list widgets. When the business expert 440 is done selecting widgets 730 for at least the end-user input 704 and search result output 710 fields, she can submit the widget selection(s) in an indication to the user interface builder component 330 by selecting the submit button 706. According to an embodiment, when the indication selecting at least the first 730a and second 730b widgets is received, the user interface builder component 330 can be configured to generate the end-user interface template 331, which in an embodiment, can be provided to the end-user 400b when a request for information relating to the first object 514 is received from the end-user 400b.

Referring again to FIG. 2A, when the business expert 440 has finished configuring the search service application 600, a code template is selected from a plurality of code templates in a code library in block 208. In an embodiment, the selected template includes code for creating a search model of a search service application. According to an embodiment, the search build model 321 can be configured to select a code template 342b that is designed to create a search model of a search service application 600.

In an embodiment, the application design engine 300 can include a code library 340, which includes a plurality of code templates 342. Each template 342 includes code and metadata that can be loaded into extensible tools, e.g., an Integrated Development Environment (IDE), to automate the development of a family of software products. According to an embodiment, each template 342 can be designed to build a family of applications, e.g., case management applications 510, where each member of the family represents a variation of the underlying application. For example, a particular code template 342 can be used to build a family of case management applications 510, which includes applications representing a loan approval process, a loan refinance process, and a loan restructure process.

In an embodiment, the code library 340 can be a software factory repository and the code templates 342 can be software factory templates. Each software factory template 342 can be associated with a software factory schema (not shown) that defines a particular family of applications. A more detailed discussion of software factories and software factory templates 342 is provided in "Software Factories: Assembling Applications with Patterns, Models, Frameworks and Tools," by Jack Greenfield and Keith Short (2004).

According to an embodiment, the selected template 342b can include code for creating a particular type of search model for the first object 514. For example, as mentioned above, when configuring the search service application 600, the business expert 440 can specify the type of search query the search service application 600 will generate for the first object 514. In an embodiment, the specified query type can be associated with a storage structure supported by a particular backend data store 450a-450c, and therefore the generated search query will be compatible with the supported storage structure. For example, when the supported storage structure is a relational database, the generated search query will be formatted as an SQL or DQL query. Accordingly, the selection of the template 342b can be based on the specified query type so that the created search model is configured to generate a search query that is compatible with the supported storage structure associated with the specified query type.

Referring again to FIG. 2A in block 210, using the selected template 342b, a search model representing the search service application for the first object is generated based at least on the end-user input field 704 and the search result output field 710. In an embodiment, the search model includes a plurality of software components for retrieving information relating to the first object 514 from a backend data store 450. The search service application builder 320 can include an application builder tool 322 configured to generate the search model based at least on the end-user input field 704 and the search result output field 710, and using the selected template 342b according to an exemplary embodiment.

In an embodiment, the application builder tool 322 can be configured to receive the template 342b from the library 340 and the business expert's selections provided via the build interfaces 700 from the search build model 321. The application builder tool 322 can then generate the software components of the search model by integrating the selections, including the end-user inputs 704 and the search result outputs 710, with the code template 342b.

Figure 6:
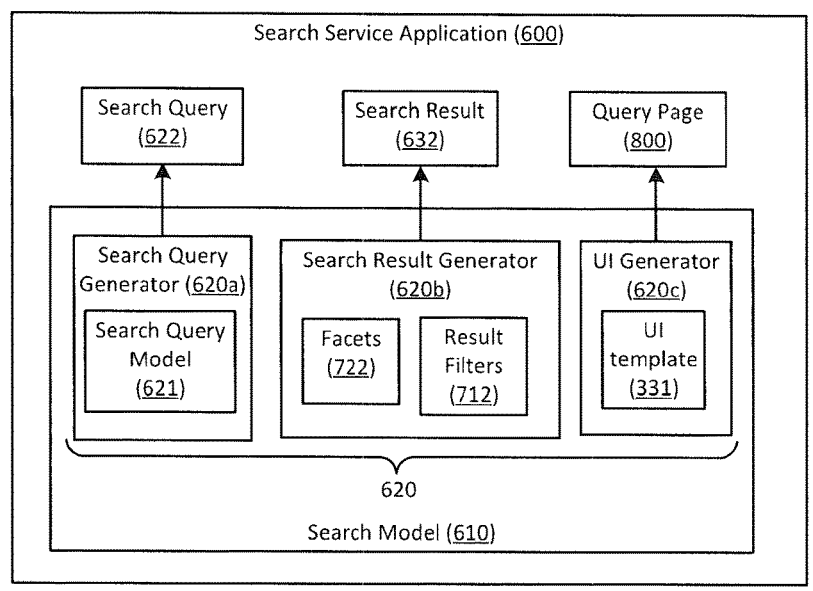
FIG. 6 is a block diagram illustrating an exemplary search service application according to an exemplary embodiment.

FIG. 6 is a block diagram illustrating an exemplary search model 610 representing a search service application 600 for the first object 514 according to an embodiment. The search model 610 includes a plurality of software components 620 that are configured to support services performed by the search service application 600 during an information retrieval process. For example, the search model 610 can include a search query generator component 620a, a search result generator component 620b, and a user interface (UI) generator component 620c.

In an embodiment, the code template 342b provides the underlying programming code associated with each of the components 620, which can be customized by the business expert's selections. For example, the search query generator component 620a can be configured to generate a search query 622 using a search query model 621 that includes at least the end-user input field 704 and the search result output field 710. In an embodiment, when a query type has been specified, the search query model 621 can be associated with the specified query type so that the search query 622 generated is compatible with the storage structure supported by the backend data store 450.

In an embodiment, the search result generator component 620b can be configured to generate a search result 632 that includes information requested by an end-user 400b. In addition, the search result generator component 620b can be configured to filter the information based on the value 716 of the selected search result filtering field 712, and/or to group the information based on the selected facets field(s) 722. Moreover, the UI generator component 620c can be configured, in an embodiment, to generate a query page 800 based on the UI template 331 designed by the business expert 440 and to provide the query page 800 to the end-user 400b when a request for information relating to the first object 514 is received from the end-user 400b and/or when the search result 632 is provided to the end-user 400b.

FIG. 8 illustrates an exemplary query page 800 that can be provided to the end-user 400b according to an embodiment. The query page 800 corresponds to the business expert's widget selections discussed above and illustrated in FIG. 7D. As is shown, the query page 800 includes an end-user input section 802 that provides input text boxes 803 for receiving from the end-user 400b values for the attributes corresponding to the end-user input fields 704, 704a. In an embodiment, the query page 800 also includes a search results section 804, which provides the values of the attributes 515 corresponding to the selected result output fields 710. In addition, the query page 800 can include a facets window 806 that can display the attributes 515 corresponding to the facets fields 722, the groups by attribute value, and the number of records in each group.

Search Service Application Deployment

According to an embodiment, once the application build tool 322 has generated and configured the software components 620 of the search model 610, the application build tool 322 can be configured to compile the programming code and to prepare the search model 610 for deployment. In an embodiment, the search service application builder component 320 in the application design engine 300 can include a deployment engine 350 configured to manage the deployment of the search service application 600. In another embodiment, the deployment engine 350 can be implemented outside of the application design engine 300, and/or in another server (not shown).

Figure 2B:
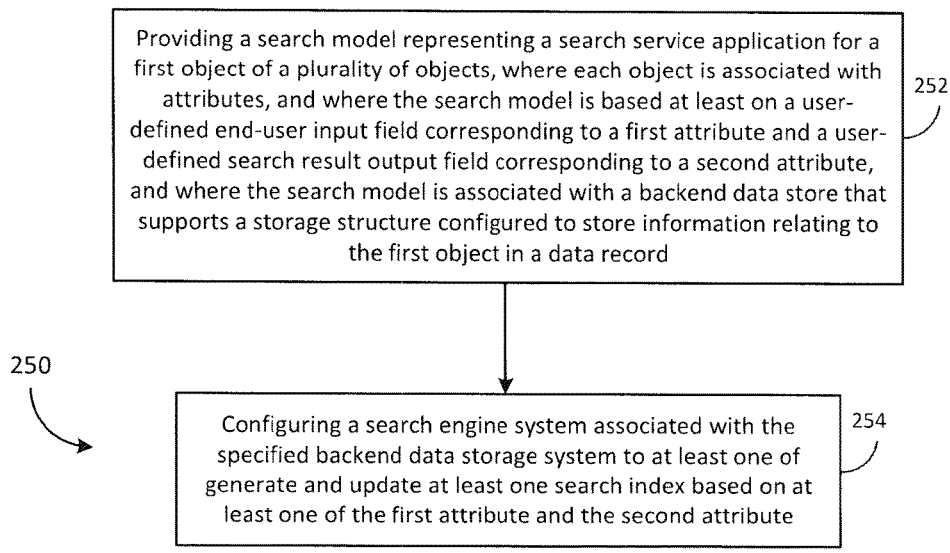
FIG. 2B illustrates a flow diagram illustrating an exemplary method for deploying a search service application according to an exemplary embodiment.

FIG. 2B illustrates a flow diagram illustrating an exemplary method 250 for deploying a search service according to an exemplary embodiment. The method 250 begins in block 252, by providing a search model 610 representing a search service application 600 for a first object 514 of a plurality of objects. In an embodiment, the search model 610 is based at least on an end-user input field 704 corresponding to a first attribute 515b of the first object 514 and a search result output field 710 corresponding to a second attribute 515c of the first object 514, where the first and second attributes are defined by a business expert 440. As described above, the search model 610 is associated with a backend data store 450 that supports a storage structure configured to store information relating to the first object 514 in a data record 460. In an embodiment, the search model 610 is provided according to the method 200 described with reference to FIG. 2A.

Referring again to FIG. 2B, when the search model 610 is provided and deployed, the deployment engine 350 can be configured, in block 254, to automatically configure the search engine 520 associated with the backend data store 450 to generate and/or update one or more search indexes 524 based on the first and/or second attributes 515b, 515c corresponding to the end-user input 704 and the search result output 710 fields. In an embodiment, the index manager 522 in the search engine 520 can be configured to manage, e.g., create, update, remove, merge, etc., the search indexes 524 pertaining to the data records 460 stored in the backend data store 450. When new or updated information 406 is received, e.g., from the task worker 400a via the case management application 510 or from the content classification engine 350, the index manager 522 can be configured to parse the information 406 to identify keywords and/or tokens, which can then be included in the appropriate search index 524.

According to an embodiment, when the search service application 600 is deployed, the deployment engine 350 can be configured to identify from the search model 610 the attributes, e.g., 515b-515d, corresponding to the end-user input 704 and search result output 710 fields, e.g., "First Name" 515b, "Last Name" 515c, "Occupation" 515d. In addition, the deployment engine 350 can be configured to identify with which of the backend data stores 450a-450c the search model 610 is associated. For example, in an embodiment, the deployment engine 350 can identify the associated data store 450 based on the query type associated with the search model 610. Once the associated backend data store 450 is identified, the deployment engine 350 can instantiate the search service application 600 for the backend data store 450 by configuring the search engine 520 associated with the data store 450 to expose the identified attributes, e.g., "First Name" 515b, "Last Name" 515c, "Occupation" 515d, in an index 524.

In an embodiment, when sorting is enabled on any of the attributes, e.g., "Last Name" 515c, corresponding to the search result output 710 fields, the deployment engine 350 can identify which attribute 515c is sort enabled, and can configure the search engine 520 to create at least one sorted search index 524a for the attribute 515c corresponding to the sort enabled search result output field 710. For example, the search engine 520 can be configured to generate a sorted search index 524a associated with the "Last Name" attribute 515c that organizes the data records in ascending or descending order by Last Name. By providing the sorted search index(es) 524a during deployment, the search engine 520 can more efficiently process sort requests during runtime.

In addition, when the search model 610 is also based on a search result filtering field 712 and/or a facets field 722 corresponding to an attribute, e.g., 515d, of the first object 514, the deployment engine 350 can be configured, in an embodiment, to identify the attribute(s) 515d corresponding to the search result filtering field 712 and/or the facets field 722, and to configure the index manager 522 to generate and/or update the search index(es) 524 to expose that attribute(s) 515d as well if necessary.

In addition to configuring the search engine, the deployment engine 350 can automatically configure the content classification engine 530 to identify information relating to at least one of the first attribute 515b and the second attribute 515c in a data record 460, e.g., a file, that is or will be stored in a storage structure supported by a backend data storage 450. In an embodiment, the content classification engine 530 can be configured to parse and semantically analyze content in the file and to apply configured classification rules relating to specified categories and/or attributes.

For example, when the content classification engine 530 is configured to apply classification rules relating to the categories/attributes of "First Name," "Last Name," and "Job Title" for a data record 460 that includes the phrase, "Felix Smith is the director of the group," the content classification engine 350 can parse the phrase and analyze the semantic structure of the phrase to determine that "Felix" is a first name, "Smith" is a last name, and "director" is a job title. This is particularly useful for data records 460 that include unstructured content because the results of the classification can be used for categorization and/or as keywords to populate content metadata for the data records 460.

According to an embodiment, the deployment engine 350 can be configured to identify the attributes 515b, 515c corresponding to the end-user input 704 and search result output 710 fields, and to configure the content classification engine 530 to apply classification rules relating to the identified attributes 515b, 515c to identify and extract information in the data records 460 relating to the identified attributes 515b, 515c. Moreover, the content classification engine 530 can be configured to include the extracted information as metadata of the data records 460, which allows the data records 460 to be indexed and searchable by the search engine system 520.

According to another embodiment, when the search model 610 is also based on a search result filtering field 712 and/or a facets field 722 corresponding to an attribute, e.g., 515d, of the first object 514, the deployment engine 350 can be configured to identify the attribute 515d corresponding to the search result filtering field 712 and/or the facets field 722, and to configure the content classification engine 350 to apply classification rules relating to the identified attribute 515d to identify and extract information in the data records 460 relating to the identified attribute 515d.

Once deployment is completed, the search service application 600 for the first object 514 can be managed by a search service manager component 540 in the case management system 403. In an embodiment, the search service manager 540 can be configured to manage a plurality of search service applications 600 for a plurality of objects 514 associated with the case management application 510.

Search Service Application Runtime

During runtime, the search service application 600 for the first object 514 can be utilized to retrieve information relating to the first object 514 from a backend data store 450a, 450b, 450c. For example, as mentioned above, the task manager 516 in the case management application 510 can distribute tasks to workers 400a, 400b. While some tasks 405 can be directed to collecting information, other tasks 405a can be directed to making a decision. In the later case, a knowledge worker 400b assigned to perform such a task 405a may need to retrieve additional information in order to reach his decision. For example, the task 405a can involve making a decision whether to provide an additional insurance policy for a customer's teenage daughter, and the knowledge worker 400b would like to retrieve information relating to the occupation of the customer.

According to an embodiment, the knowledge worker 400b, i.e., the end-user, can transmit a search request 415 for information relating to a customer object, i.e., the first object 514, to the content management system 403. In an embodiment, the search request 415 can include information identifying the first object 415, such as an object identifier or name. The command handler component 507 can receive the request 415 via the incoming message handler 505 and route the request 415 to the case management application 510, which can be configured to receive the request 415, and to invoke the search service application 600 for the first object 514, e.g., the customer object. Alternatively, or in addition, the command handler component 507 can route the request 415 to the search service manager component 540, which can be configured to launch the search service application 600.

When invoked or launched, the search service application 600 can be configured to transmit the query page 800 to the knowledge worker 400b so that the knowledge worker 400b can submit to the search service application 600 the values for the attributes 515 corresponding to the end-user search input fields 704, 704a. For example, in FIG. 8, the attribute(s) 515b, 515c of the customer object 514 corresponding to the end-user input field(s) 704, 704a are "First Name" and "Last Name," respectively, and the knowledge worker 400b can, in an embodiment, submit a customer's first and last names to the search service application 600 via the query page 800. In addition, because the query type associated with the search service application 600 is a full-text query, the knowledge worker 400b can also submit at least one string as a search criterion.

In an embodiment, the search query generator component 620a in the search model 610 can be configured to receive the value(s) for the attribute(s) 515b, 515c corresponding to the end-user input field(s) 704, 704a, and to generate a search query 622 based on the received value(s). For example, according to an embodiment, the search query generator 620a can use the search query model 621 to generate a search query 622 that includes a search criteria based on the values for the attributes 515b, 515c corresponding to the end-user input fields 704, 704a, and that also includes the attributes 515b, 515c, 515d corresponding to the search result output field(s) 710. In addition, when a query type has been specified, the search query 622 generated by the search query model 621 can be compatible with the backend storage structure associated with the query type.

According to an embodiment, the search service application 600 can be configured to invoke the search engine 520 to retrieve at least one data record 460 that includes the information requested by the end-user. For example, the search query 622 can be provided to the search engine 520, which can be configured to process the search query 622 against the corresponding backend data store 450. In an embodiment, the search engine 520 can be configured to scan at least one of the search indexes 524 to locate data records 460 related to the first object 514 that include the requested information, and to return the located data records 460 to the search service application 600.

In an embodiment, the search result generator component 620b can be configured to receive the retrieved/located data record(s) 460 and to generate the search result 632 based at least on the data records 460. For example, the search result generator component 620b can be configured to format the retrieved information so that it can be included in the search results section 804 of the query page 800. In another embodiment, the search result generator component 620b can be configured to filter the data records 460 based on the selected search result filtering field(s) 712, and/or to group the data records 460 based on the selected facets field(s) 722.

According to an embodiment, when the search result 632 is generated, the search service application 600 can be configured to provide the search result 632 to the knowledge worker/end-user 400b. For example, the resulting search result 632 can be provided, in an embodiment, to the UI generator 620c so that it can be included in the search results section 804 and in the facets window 806 of the query page 800. In another embodiment, the knowledge worker/end-user 400b can include a user interface component (not shown) that can receive the search result 632 and generate a page for displaying the search result 632 to the knowledge worker 400b. The search service application 600 can be configured, in an embodiment, to transmit the search result 632 and/or the query page 800 to the knowledge worker/end-user 400b. For example, the search service application 600 can be configured to provide the search result 632 and/or the query page 800 to an outgoing message handler 506 in the case management system 403. In an embodiment, the outgoing message handler 506 can be configured to build a packet including the search result 632 and/or query page 800 and to interoperate directly with the protocol layer of the network subsystem 503 or with an application protocol layer, as described above and illustrated by the exemplary HTTP protocol layer 504. The packet can be transmitted as a whole or in parts via the network subsystem 503 over the network 404 to the knowledge worker/end-user 400b.

According to exemplary embodiments, the business expert 440 of an enterprise can design, build, and deploy a customized search service application 600 using a search build model 321 provided by an application design engine 300. Moreover, the business expert 440 can easily modify the search service application 600 by changing the search model 610 representing the search service application 600. In an embodiment, the business expert 440 needs little or no computer programming experience or knowledge of data storage structures and/or query languages to build and/or update the application 600. A plurality of search service applications 600 can be built for a plurality of objects 514 for any or all phases of the business process lifecyle. Because the applications 600 are built using a code template 342b, the applications 600 can be consistent with one another and not dependent on the whims of different programming professionals.

In addition, once built, the application(s) 600 can be automatically deployed and the search engines 520 associated with the data stores 450 can be automatically configured to process search queries generated by the applications 600 efficiently. Because these functions are performed automatically, the business expert 440 can focus on designing, as opposed to deploying, the search service applications 600. Accordingly, in an embodiment, a search-based case management application 510 can be provided and deployed in a flexible, cost-effective and time efficient manner.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for building a search service, the system comprising:
   one or more processors; and
   a non-transitory computer readable medium storing a plurality of instructions that are executable by the one or more processors to:
   receive a request to build a search service application for a first object selected from a plurality of objects, wherein each of the plurality of objects is associated with a plurality of attributes;
   retrieve and present for selection the plurality of attributes associated with the first object;
   receive a selection of an end-user input field corresponding to a first attribute selected from the plurality of attributes associated with the first object and a selection of a search result output field corresponding to a second attribute selected from the plurality of attributes associated with the first object;
   build the search service application for the first object of the plurality of objects, the search service application being built based on at least the received selection of the end-user input field corresponding to the first attribute selected from the plurality of attributes associated with the first object and the received selection of the search result output field corresponding to the second attribute selected from the plurality of attributes associated with the first object, wherein the first attribute corresponding to the end-user input field is explicitly selected as a searchable attribute by a business expert user and the second attribute corresponding to the search result output field is explicitly selected as a displayable search result attribute by the business expert user, and wherein the search service application is associated with a backend data store system that supports a storage structure configured to store information relating to the first object in a data record; and
   deploy the built search service application, the deploying including instantiating the built search service application for the backend data store and configuring a search engine associated with the backend data store system to structurally modify a structure of at least one search index based on the first attribute corresponding to the received selection of an end-user input field and the second attribute corresponding to the received selection of the search result output field,
   wherein the structurally modifying the structure of the at least one search index includes identifying, from a search model representing the built search service application, the first attribute and the second attribute, and configuring the search engine to expose the identified first attribute and identified second attribute in the at least one search index.

2. The system of claim 1 wherein the second attribute corresponding to the search result output field is sort enabled and wherein the plurality of instructions are executable by the one or more processors to configure the search engine to generate at least one sorted search index for the second attribute.

3. The system of claim 1 wherein the search service application is built further based on at least one of a search result filtering field corresponding to a third attribute selected from the plurality of attributes associated with the first object and a facets field corresponding to a fourth attribute of the plurality of attributes associated with the first object, and wherein the plurality of instructions are executable by the one or more processors to configure the search engine to, at least one of: generate and update at least one search index based on the third attribute corresponding to at least one of the search result filtering field and the fourth attribute corresponding to at least one of the facets field.

4. The system of claim 1 wherein the data record includes unstructured content and wherein the plurality of instructions are executable by the one or more processors to configure a content classification engine to identify information relating to at least one of the first attribute and the second attribute in the data record that is one of stored and will be stored in the storage structure in the identified backend data store system, wherein the content classification engine is configured to include the identified information relating to at least one of the first attribute and the second attribute as metadata of the data record.

5. The system of claim 4 wherein the search service application is built further based on at least one of a search result filtering field corresponding to a third attribute of the plurality of attributes associated with the first object and a facets field corresponding to a fourth attribute of the plurality of attributes associated with the first object, and wherein the plurality of instructions are executable by the one or more processors to configure the content classification engine to identify information relating to an attribute corresponding to at least one of the search result filtering field and the facets field.

6. The system of claim 1, wherein the plurality of instructions are executable by the one or more processors to:
   receive from an end-user a request for information relating to the first object and a value for the first attribute corresponding to the end-user input field;
   generate a search query including a search criterion based on the value for the first attribute corresponding to the end-user input field, and including the second attribute corresponding to the search result output field; and
   invoke the search engine to retrieve at least one data record that includes the information requested by the end-user; and
   wherein the search engine is configured to:
   scan at least one of the indexes to locate at least one data record related to the first object that includes the information requested; and
   return the at least one located data record to the search service application.

7. The system of claim 6, wherein the plurality of instructions are executable by the one or more processors to:

receive from the search engine the at least one located data record; generate a search result including the at least one located data record; and provide the search result to the end-user.

8. The system of claim 7 wherein the search service application is built further based on a search result filtering field corresponding to a third attribute selected from the plurality of attributes associated with the first object, and wherein the plurality of instructions are executable by the one or more processors to generate the search result by filtering the at least one located data record based on a value for the third attribute corresponding to the search result filtering field.

9. The system of claim 7 wherein the search service application is built further based on a facets field corresponding to a third attribute of the plurality of attributes associated with the first object, and wherein the plurality of instructions are executable by the one or more processors to generate the search result by grouping the at least one located data record by the third attribute corresponding to the facets field.

10. The system of claim 1 further comprising a processor-based case management application for a business process executed on the computer, the case management application comprising configuration information defining the plurality of objects including the first object for the business process, and configured for receiving a request for information relating to the first object from an end-user, and for invoking the search service application for the first object in response to receiving the request.

11. A non-transitory machine-readable medium carrying one or more sequences of instructions for providing a search service, the instructions executable by one or more processors to:
receive a request to build a search service application for a first object selected from a plurality of objects, wherein each of the plurality of objects is associated with a plurality of attributes;
retrieve and present for selection the plurality of attributes associated with the first object;
receive a selection of an end-user input field corresponding to a first attribute selected from the plurality of attributes associated with the first object and a selection of a search result output field corresponding to a second attribute selected from the plurality of attributes associated with the first object;
build the search service application for the first object of the plurality of objects, the search service application being built based on at least the received selection of the end-user input field corresponding to the first attribute selected from the plurality of attributes associated with the first object and the received selection of the search result output field corresponding to the second attribute selected from the plurality of attributes associated with the first object, wherein the first attribute corresponding to the end-user input field is explicitly selected as a searchable attribute by a business expert user and the second attribute corresponding to the search result output field is explicitly selected as a displayable search result attribute by the business expert user, and the search service application being associated with a backend data store system that supports a storage structure configured to store information relating to the first object in a data record; and
deploy the built search service application, the deploying including instantiating the built search service application for the backend data store and configuring a search engine associated with the backend data store system to structurally modify a structure of at least one search index based on of the first attribute corresponding to the received selection of an end-user input field and the second attribute corresponding to the received selection of the search result output field,
wherein the structurally modifying the structure of the at least one search index includes identifying, from a search model representing the built search service application, the first attribute and the second attribute, and configuring the search engine to expose the identified first attribute and identified second attribute in the at least one search index.

12. A method for building a search service, the method comprising:
receiving a request to build a search service application for a first object selected from a plurality of objects, wherein each of the plurality of objects is associated with a plurality of attributes;
retrieve and present for selection the plurality of attributes associated with the first object;
receiving a selection of an end-user input field corresponding to a first attribute selected from the plurality of attributes associated with the first object and a selection of a search result output field corresponding to a second attribute selected from plurality of attributes associated with the first object;
building, by a computer device, the search service application for first object of the plurality of objects, the search service application being built based on at least the received selection of the end-user input field corresponding to the first attribute selected from the plurality of attributes associated with the first object and the received selection of the search result output field corresponding to the second attribute selected from the plurality of attributes associated with the first object, wherein the first attribute corresponding to the end-user input field is explicitly selected as a searchable attribute by a business expert user and the second attribute corresponding to the search result output field is explicitly selected as a displayable search result attribute by the business expert user, and the search service application being associated with a backend data store system that supports a storage structure configured to store information relating to the first object in a data record; and
deploying the built search service application, the deploying including instantiating the built search service application for the backend data store and configuring, by the computer device, a search engine associated with the backend data store system to structurally modify a structure of at least one search index based on of the first attribute corresponding to the received selection of an end-user input field and the second attribute corresponding to the received selection of the search result output field,
wherein the structurally modifying the structure of the at least one search index includes identifying, from a search model representing the built search service application, the first attribute and the second attribute, and configuring the search engine to expose the identified first attribute and identified second attribute in the at least one search index.

13. The method of claim 12 wherein the second attribute corresponding to the search result output field is sort enabled, the method further comprising configuring the search engine to generate at least one sorted search index for the second attribute.

14. The method of claim 12 wherein the search service application is built further based on at least one of a search result filtering field corresponding to a third attribute selected from the plurality of attributes associated with the first object and a facets field corresponding to a fourth attribute of the plurality of attributes associated with the first object, the method further comprising configuring, by the computer device, the search engine to, at least one of: generate and update at least one search index based on the third attribute corresponding to at least one of the search result filtering field and the fourth attribute corresponding to at least one of the facets field.

15. The method of claim 12 wherein the data record includes unstructured content and wherein the method further includes configuring, by the computer device, a content classification engine to identify information relating to at least one of the first attribute and the second attribute in the data record that is one of stored and will be stored in the storage structure in the identified backend data store system, wherein the content classification engine is configured to include the identified information relating to at least one of the first attribute and the second attribute as metadata of the data record.

16. The method of claim 15 wherein the search service application is built further based on at least one of a search result filtering field corresponding to a third attribute of the plurality of attributes associated with the first object and a facets field corresponding to a fourth attribute of the plurality of attributes associated with the first object, the method further comprising configuring the content classification engine to identify information relating to an attribute corresponding to at least one of the search result filtering field and the facets field.

17. The method of claim 12 further comprising:
receiving, by the computer device, from an end-user a request for information relating to the first object and a value for the first attribute corresponding to the end-user input field;
generating, by the search service application, a search query including a search criterion based on the value for the first attribute corresponding to the end-user input field, and including the second attribute corresponding to the search result output field;
scanning, by the search engine, at least one of the indexes to locate at least one data record related to the first object that includes the information requested; and
generating, by the search service application, a search result including the at least one located data record.

18. The method of claim 17 wherein the search service application is built further based on a search result filtering field corresponding to a third attribute of the plurality of attributes associated with the first object, and wherein generating the search result includes filtering the at least one identified data record based on a value for the third attribute corresponding to the search result filtering field.

19. The method of claim 17 wherein the search service application is built further based on a facets field corresponding to a third attribute of the plurality of attributes associated with the first object, and wherein generating the search result includes grouping the at least one identified data record by the third attribute corresponding to the facets field.

20. The method of claim 12 further comprising providing, by the computer device, a case management application for a business process, the case management application comprising configuration information defining the plurality of objects including the first object for the business process, wherein the method further includes:
receiving, by the case management application, a request for information relating to the first object from an end-user;
invoking the search service application for the first object in response to receiving the request; and
transmitting the request for information from the end-user to the search service application for the first object.

* * * * *

UNITED STATES PATENT AND TRADEMARK OFFICE
CERTIFICATE OF CORRECTION

PATENT NO. : 10,157,229 B1
APPLICATION NO. : 13/537311
DATED : December 18, 2018
INVENTOR(S) : Pierre-Yves Chevalier et al.

Page 1 of 1

It is certified that error appears in the above-identified patent and that said Letters Patent is hereby corrected as shown below:

In the Specification

Column 16, at Line 31, replace "lifecyle" with --lifecycle--.

Column 17, at Line 60, between "store" and "and" add --system--.

In the Claims

Column 18, at Line 25, delete "at least one of".

Column 19, at Line 24, replace "the computer" with --a computer--.

Column 19, at Line 67, between "store" and "and" add --system--.

Column 20, at Line 27, between "from" and "plurality" add --the--.

Column 20, at Line 30, between "for" and "first" add --the--.

Column 20, at Line 51, between "store" and "and" add --system--.

Column 21, at Line 15, delete "at least one of".

Signed and Sealed this
Seventeenth Day of September, 2019

Andrei Iancu
*Director of the United States Patent and Trademark Office*